June 18, 1968  G. M. KETCHAM  3,389,332
METHOD AND INDUCTIVE APPARATUS FOR MEASURING FLUID
CONDUCTIVITY WITH TEMPERATURE COMPENSATING MEANS
Filed Feb. 14, 1966  2 Sheets-Sheet 1
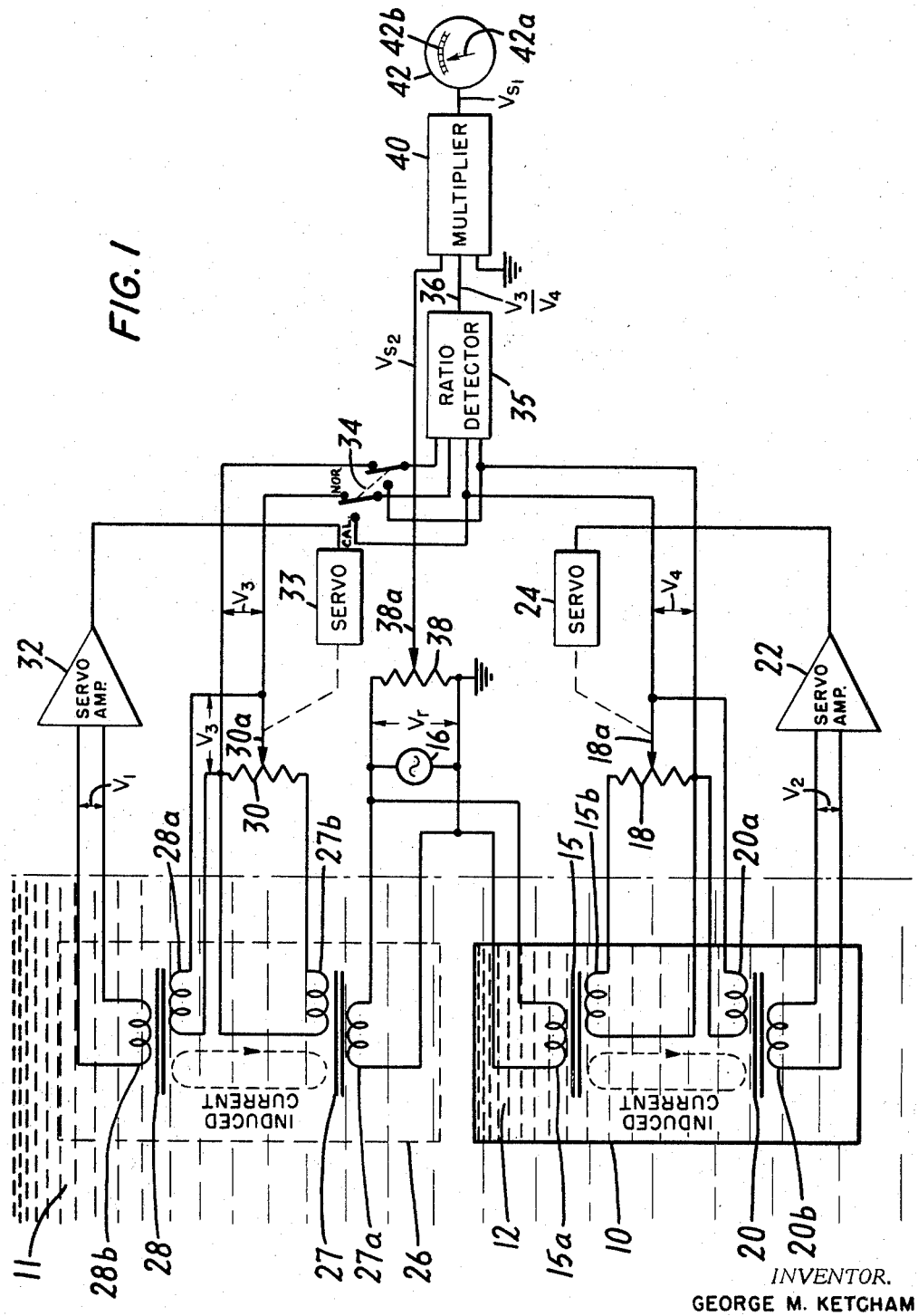
INVENTOR.
GEORGE M. KETCHAM
BY
Brumbaugh, Free, Graves & Donohue
his ATTORNEYS

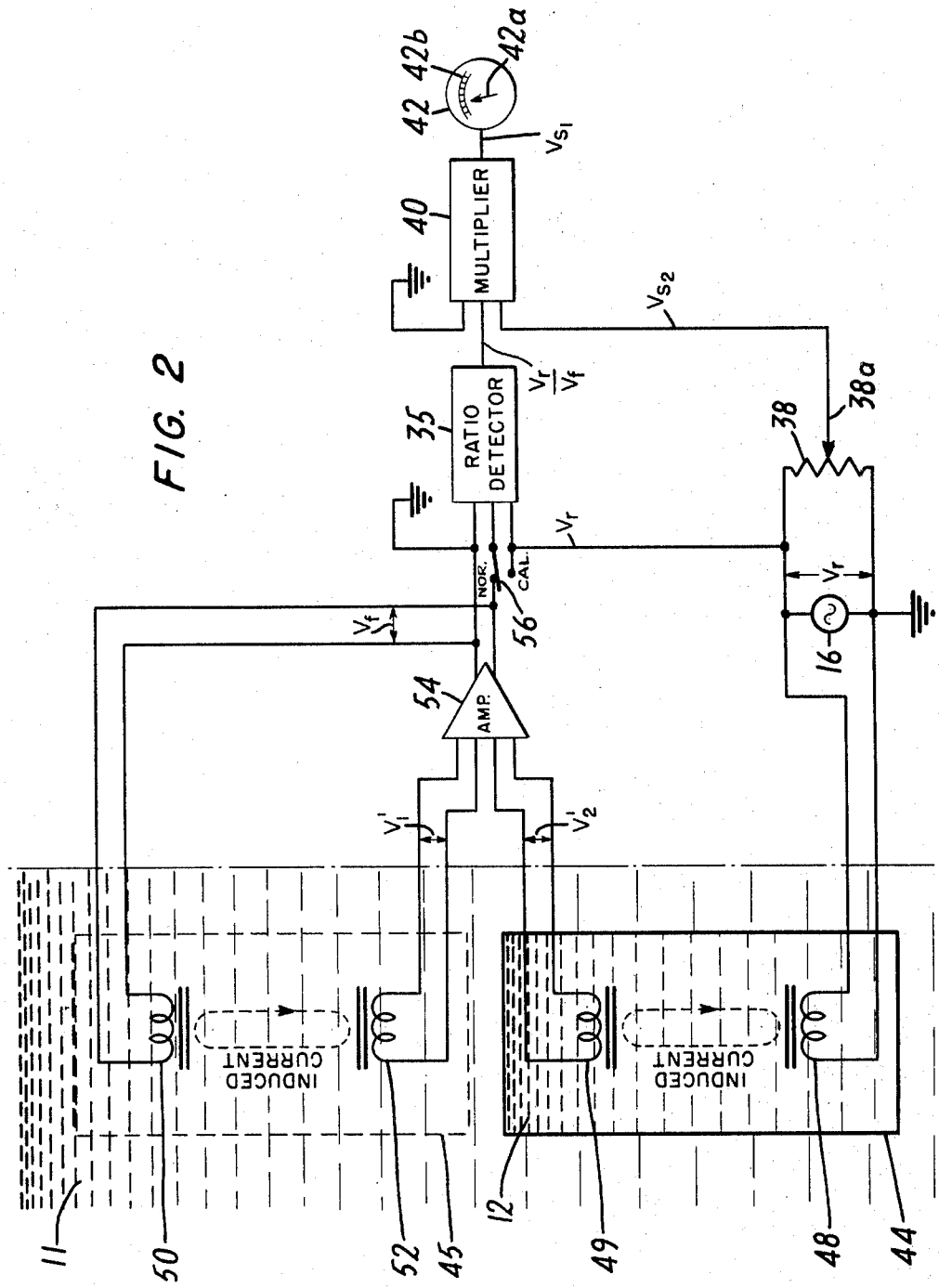

United States Patent Office 3,389,332
Patented June 18, 1968

3,389,332
METHOD AND INDUCTIVE APPARATUS FOR MEASURING FLUID CONDUCTIVITY WITH TEMPERATURE COMPENSATING MEANS
George M. Ketcham, Mystic, Conn., assignor to General Dynamics Corporation, New York, N.Y., a corporation of Delaware
Filed Feb. 14, 1966, Ser. No. 527,027
13 Claims. (Cl. 324—30)

ABSTRACT OF THE DISCLOSURE

A device is provided for determining the salinity of a sample fluid in situ with temperature compensation by inducing an alternating current in a sample of the fluid being analyzed and in a cell immersed in the sample fluid and containing a reference fluid having known electrolytic properties. The signals from each are compared to produce a signal representing the ratio of fluid conductivity from which may be determined the ratio of the salinity of the sample to the salinity of the reference fluid.

---

This invention relates to the measurement of the conductivity or salinity of fluids, and more particularly to a method and apparatus for directly providing continuous and accurate indications of fluid salinity.

Among the known methods of measuring the conductivity or salinity of a fluid is titration. This is a chemical procedure in which a sample of the fluid (e.g., sea water) is subjected to volumetric analysis to determine its chemical composition. Because of the equipment necessary for analysis, this method is primarily suited for performance only in a laboratory.

Another known method is to pass an electric current between two spaced electrodes immersed in the fluid and measure the current and temperature of the fluid for the duration of the analysis. The current and temperature measurements are then correlated and fluid salinity computed, either manually or electronically. This method is disadvantageous because the electrodes corrode in the presence of saline solutions and tend to electrolyze the fluid sample. Moreover, in sea water, measurement accuracy is impaired by plant and animal growth which may accumulate on the electrodes over a period of time.

A further method is similar to the proceding one, except that the current is induced in the fluid through suitable means, rather than passing the current directly through the fluid between the electrodes. Of the systems using this third method, many are ill-suited to measuring the changing conductivity of a flowing fluid, since they require manual manipulation of the apparatus employed.

Additionally, many of the measurement systems employing one of the above methods utilize direct temperature measurement in computing salinity. This requires apparatus which can critically indicate fluid temperature at all times so that the necessary corrective factor may be applied to computations.

It is therefore an object of this invention to provide a method and apparatus for measuring the conductivity or salinity of a fluid which overcome to disadvantages of prior art methods and apparatus.

Another object of the invention is to provide a method and apparatus which is capable of continuously monitoring and measuring the conductivity of a flowing fluid.

A still further object of the invention is to provide methods and apparatus for directly indicating fluid conductivity or salinity without necessitating direct measurement of fluid temperature.

The invention attains these and other objects by inducing an alternating current in a sample fluid being analyzed and in a cell immersed in the sample fluid and containing a reference fluid having known electrolytic properties. First signals responsive to the conductivity of the respective fluids are obtained and compared to produce a signal representing the ratio of fluid conductivities. Since both the reference and sample fluids are always at the same temperature, the conductivity ratio is unaffected by temperature variations. Multiplication of this ratio by the conductivity or salinity of the reference fluid yields a direct measurement of the conductivity or salinity of the sample fluid.

In certain embodiments of the invention, a transformer having primary and secondary windings may be immersed in either or both of the fluids, the secondary winding developing an output signal in response to the magnetic field created by the induced current. This output signal excites a servo loop which in turn, produces an opposing signal which is applied to the primary winding to null the output signal. The opposing signals are then compared to derive the fluid conductivity ratio.

In other embodiments, single inductors are used to induce the alternating current and to develop the output signals which are then compared to produce an exciting signal for the current inducing inductor. The exciting signal adjusts the intensity of the induced current to make the amplitudes of the output signals equal. Following, the exciting signal is compared with a reference signal to obtain the ratio of fluid conductivities.

For a better understanding of the invention, reference may be made to the following detailed description, and the accompanying drawings, in which:

FIGURE 1 is a schematic representation of a system in accordance with the invention for obtaining a direct measurement of salinity; and FIGURE 2 is a schematic representation of another salinity measuring system in accordance with the invention.

One of the chief disadvantages of most conductivity or salinity measuring systems is their temperature dependence; that is, their reliance on temperature compensation. In these systems, the temperature factor is usually introduced either by making a direct reading of temperature or by integrating a temperature compensating element (e.g., a thermistor) into the system to automatically compensate for fluid temperature variations. In either case, the accuracy of the measurement depends on the accuracy of temperature compensation or temperature measurement. In the systems about to be described, however, no measurement of temperature or temperature compensation, as such, is required.

FIGURE 1 illustrates a system giving direct measurements of fluid salinity or conductivity. This system includes a reference cell 10 containing a fluid 12 of known conductivity and salinity and sealed for immersion in the sample fluid 11 whose salinity is to be determined. The reference fluid will usually be the same as the fluid being analyzed. For example, if sea water is being analyzed, the reference cell will also contain sea water. Inside the reference cell 10 is a transformer 15 having a primary winding 15a, excited by an alternating current source 16, and a secondary winding 15b connected across a potentiometer 18. Spaced from the transformer 15 in the fluid is a second transformer 20, also having a primary winding 20a and a secondary winding 20b.

Connected to receive signals developed across the secondary winding 20b in response to induced currents in the fluid 12 is a servo amplifier 22 whose output drives the servo mechanism 24. As indicated by the broken line, the movable contact 18a of the potentiometer is positioned mechanically by the servo mechanism 24. The voltage picked off by the potentiometer contact 18a, in turn, feeds the transformer primary winding 20a. These three elements, servo amplifier 22, servo mechanism 24, the potentiometer 18, constitute a servo loop between the primary winding 20a and the secondary winding 20b. It is understood that the term "servo loop" encompasses an all-electronic feedback loop, as well. This loop might employ, for example, analog or digital elements, or a combination of both, in place of the electromechanical servo loop shown. The particular advantage of an electromechanical servo loop, however, is its inherent accuracy.

A second cell 26, indicated by the dashed line enclosure, receives the sample fluid 11, when immersed. Both the cell 10 containing the reference fluid and the cell 26 may be parts of a single sensing assembly, since they must be in relatively close proximity so that the temperature of the fluid 12 coincides with the temperature of the ambient fluid 11.

The cell 26 contains elements generally identical to those in the cell 10. These elements include a first transformer 27 having a primary winding 27a, also excited by the alternating current source 16, and a secondary winding 27b. A second transformer 28 has its primary winding 28a connected to receive a voltage signal picked off by the movable contact 30a of the potentiometer 30. As in the arrangement of the reference cell 10, signals developed across the secondary winding 28b are fed to a servo amplifier 32, the output of which drives the servo mechanism 33 to position the movable potentiometer contact 30a and provide a feedback signal to the transformer primary winding 28a.

As shown, the feedback, or opposing, signals applied to the respective primary windings 20a, 28a are also fed through a calibration switch 34 (the function of which will be explained shortly) to the input of a conventional ratio detector 35 which compares these signals and provides at its output 36 a signal which is the ratio of the two feedback signals. Also excited by the alternating current source 16 is a potentiometer 38 whose movable contact 38a may be positioned to feed a signal representing the salinity of the reference fluid 12 to the input of a multiplier 40. This signal is then combined with the signal from the ratio detector output 36 to derive a signal representing the product of these two signals, i.e., the product of the predetermined salinity of the reference fluid 12 times the measured fluid salinity ratio. A suitable indicator 42 receives this product signal which positions the indicator pointer 42a relative to a scale 42b where the fluid salinity is read directly.

The system of FIGURE 1 operates as follows. When power is applied from the alternating current source 16 to the transformer primary windings 15a, 27a, currents are induced in the respective fluids 12, 11, as indicated by the broken line current loops. The magnitudes of the induced currents depend on the conductivities of the respective fluids 11, 12, which are directly related to fluid salinity. These currents create magnetic fields linking the transformer secondary winding 20b in the reference cell and the transformer secondary winding 28b in the sampling cell 26, developing voltage signals $V_2$, $V_1$, respectively. Since the magnetic fields in the fluids are proportional to the strength of the induced currents, the magnitudes of the voltage signals $V_1$, $V_2$ are also directly related to fluid conductivity (or salinity).

If $S_1$ is the steady-state transfer constant between the transformer primary winding 27a and the transformer secondary winding 28b at any instant, then $V_1$ may be expressed as $$V_1 = S_1 V_r \qquad (1)$$

where $V_r$ is the constant frequency A.C. reference voltage supplied by the source 16.

Similarly, the transformer output voltage $V_2$ is $$V_2 = S_2 V_r \qquad (2)$$

where $S_2$ is the steady-state transfer constant between the transformer primary winding 15a and the secondary winding 20b. It is important to note that $S_1$ and $S_2$, the transfer constants through the fluids 11, 12, are variable; i.e., they are indicative of the temperatures and conductivities of the fluids.

The signal $V_1$ is amplified in the servo amplifier 32 and applied to the servo mechanism 33 which drives the movable potentiometer contact 30a until the voltage signal $V_3$ at the transformer primary winding 28a exactly cancels or nulls the voltage $V_1$ at the secondary winding 28b. If $A_1$ represents the servo loop gain, i.e., $A_1 = V_3/V_1$, then $$V_3 = A_1 S_1 V_r \qquad (3)$$

From inspection, parallel expressions describing the voltage relationship in the servo loop associated with the reference cell 10 may also be written. These are:

$$A_2 = V_4/V_2$$

$$V_4 = A_2 S_2 V_r \qquad (4)$$

Assume, for simplicity, that each of the cells 10, 26 and the associated servo loops are identical so that $A = A_1 = A_2$. A comparison of $V_3$ and $V_4$ in the ratio detector 35 then provides a signal representing the relative measured salinities of the sample fluid 11 and the reference fluid 12. Thus, $$\frac{V_3}{V_4} = \frac{A S_1 V_r}{A S_2 V_r} = \frac{S_1}{S_2} \qquad (5)$$

The system is initially calibrated such that a signal $V_{S_2}$ is set into the multiplier 40 by the potentiometer 38. This signal represents the salinity $S_2$ of the reference fluid 12 at reference or test conditions. When this signal $V_{S_2}$ is combined in the multiplier 40 with the signal from the ratio detector, a signal corresponding to the salinity $S_1$ of the sample fluid 11 at standard conditions is obtained; that is, $$\frac{V_3}{V_4} \cdot V_{S_2} = \frac{S_1}{S_2} \cdot S_2 \text{ (ref.)} = V_{S_1} = S_1 \text{ (ref.)} \qquad (6)$$

$V_{S_1}$ is therefore registered on the indicator 42, where the salinity of the sample fluid 11 at reference or calibration conditions is registered.

Calibration of the system can be accomplished when the cells 10, 26 are at the actual site at which measurements are to be made. To calibrate, the normally closed switch 34 is through from the normal ("NOR") position to the calibrate ("CAL") position, thereby tying the signal $V_4$ into the $V_3$ input to the ratio detector 35. At the same time, the normal $V_3$ signal is removed. With the apparatus in this condition, $V_3/V_4 = 1$ and the meter 42 will register whatever corresponds to the reference signal $V_{S_2}$ set in by the potentiometer 38. $V_{S_2}$, therefore, would be adjusted so that the meter will read the salinity $S_2$ of the reference fluid 12. Calibration is completed by returning the switch 34 to the "NOR" position. By proceeding in this simple manner, the system can be calibrated under actual test or measurement conditions without the necessity for correcting for density, temperature, and pressure of the fluids at the test site.

FIGURE 2 shows another system according to the invention, utilizing the same principles as those previously discussed in connection with FIGURE 1. In this system, however, the computation has been simplified and different transformer units are used in the reference cell 44 and the sampling cell 45. The reference cell 44 contains a first inductor 48 coupled to the source 16 for inducing the alternating current in the reference fluid and a second inductor 49 for developing the voltage signal $V_2'$ in response to the magnetic field created by the current. Similarly, the sampling cell 45 includes a current-inducing inductor 50 and a second inductor 52 across which the voltage signal $V_1'$ appears.

As in the FIGURE 1 system, the output voltages $V_1'$ and $V_2'$ are dependent on the temperature and salinity of the fluids in the respective cells 44, 45. The output signals $V_1'$ and $V_2'$ are compared in the amplifier 54, which may be a high-gain operational amplifier, for example, the output signal $V_f$ of which is $$V_f = G(V_1' - V_2') \qquad (7)$$

where G is the amplifier gain. In terms of the source voltage $V_r$ and the steady-state transfer function $S_1$, $S_2$ between inductors, $$V_1' = S_1 V_f \qquad (8)$$

$$V_2' = S_2 V_r \qquad (9)$$

Substituting expressions (8) and (9) in Equation (7) and solving, we obtain $$V_f = \frac{S_2 V_r G}{(GS_1 - 1)} \qquad (10)$$

Since $G \gg 1$, expression (10) becomes $$V_f = \frac{S_2}{S_1} \cdot V_r \qquad (11)$$

Next, the source reference signal $V_r$ is compared in the ratio detector 35 with the feedback signal $V_f$ from the amplifier 54 to get the ratio $V_r/V_f = S_1/S_2$. Multiplication of this ratio by the calibration signal $V_{S_2}$ from the potentiometer 38 yields $$\frac{V_r}{V_f} \cdot V_{S_2} = \frac{S_1}{S_2} S_2 \text{ (ref.)} = V_{S_1} = S_1 \text{ (ref.)} \qquad (12)$$

Calibration of this system is identical to the procedure employed with the FIGURE 1 system. That is, the switch 56 is moved from the "NOR" to the "CAL" position to connect $V_r$ to the $V_f$ input to the ratio detector 35. The ratio $V_r/V_f$ is now equal to 1 and the potentiometer 38 is adjusted to register $S_2$ (ref.) on the indicator 42. Afterward, the switch 56 is returned to the "NOR" position, at which time a reading of $S_1$ (ref.) will appear on the indicator 42.

Thus, in either the system of FIGURE 1 or the system of FIGURE 2, the salinity or conductivity of the sample fluid is measured directly without necessitating a temperature measurement of any kind. It is the reference cell which makes this possible, along with the method of comparison, so that a ratio of the salinities of the two fluids is obtained. Since the reference cell and the sampling cell are immersed in the same environment, ambient temperature changes do not affect the salinity ratio, even though the signals $V_1$, $V_2$ or $V_1'$, $V_2'$ may vary continuously due to temperature effects. Moreover, because in these systems a comparison of the conductivity of a reference fluid with the conductivity of the sample fluid is made continuously, manual manipulation of the measuring equipment is unnecessary.

Although the invention has been described with reference to specific embodiments thereof, these are representative only, and many modifications and variations, both in form and detail, may be made therein within the skill of the art. For example, the invention is equally compatible with digital apparatus in which analog signals derived from the inductors in the cells are converted into digital signals, and conversely, digital signals into analog signals, as the case may require. All such modifications and variations, therefore, are intended to be included within the scope and spirit of the appended claims.

I claim:

1. In a system for obtaining indications of the conductivity of a sample fluid, a first inductor adapted for immersion in the sample fluid, a cell containing a reference fluid of known conductivity and including a second inductor immersed in the reference fluid, said cell adapted for immersion in the sample fluid, means for inducing alternating currents in the fluids to develop output signals across the respective inductors in response to the magnetic field created by said currents, and means responsive to said output signals for producing a signal representative of the conductivity ratio of the respective fluids.

2. In a system for obtaining indications of the conductivity of a fluid, means adapted for immersion in the fluid for inducing an alternating current therein, said immersible means including a transformer having a primary winding and an output winding responsive to the magnetic field created by said current to provide an output signal, means responsive to said output signal for applying an opposing signal to said primary winding to null said output signal, means adapted for immersion in the fluid in proximity to said current inducing means and providing an electrical signal representative of the temperature of the fluid, and means for comparing said opposing signal and said temperature signal to obtain a ratio thereof.

3. In a system for obtaining indications of the conductivity of a fluid, a sensing assembly adapted for immersion in the fluid and including a first cell containing a reference fluid and a second cell open to the immersion fluid, means in each of the cells for inducing an alternating current in the respective fluids, transformer means in each of the cells including a primary winding and a secondary winding responsive to the magnetic field created by the current to provide output signals, and means responsive to the respective output signals for applying opposing signals to the respective primary windings to null said output signals.

4. A system in accordance with claim 3 for obtaining direct indications of the salinity of a fluid, further comprising means responsive to the respective opposing voltages for producing a signal representative of the ratio thereof, and means for combining said ratio signal with a reference signal representing the salinity of said reference fluid to obtain the product thereof.

5. In a method for obtaining indications of the conductivity of a fluid, the steps of immersing in the fluid transformer means having primary and secondary windings, inducing an alternating current in the fluid, detecting an output signal developed across the secondary windings in response to said current, applying an opposing signal to said primary winding to null the output signal, immersing in the fluid a cell containing second transformer means immersed in a reference fluid and having primary and secondary windings, inducing an alternating current in the reference fluid, detecting an output signal developed across the secondary winding in response to said current in the reference fluid, applying a second opposing signal across said secondary winding in the reference cell to null the output signal, and comparing the respective said opposing signals to obtain a ratio thereof.

6. A method as recited in claim 5 for obtaining direct indications of the salinity of the fluid, comprising, in addition, the step of combining said ratio signal with a reference signal representing the salinity of the reference fluid to obtain the product thereof.

7. In a system for obtaining indications of the conductivity of a sample fluid, a sensing assembly adapted for immersion in the fluid including first inductor means for inducing an alternating current in the fluid and means for generating a signal representative of the temperature of the fluid, said assembly further including second inductor means responsive to the magnetic field created by the current for producing an output signal, and means for comparing said output and temperature signals to provide a feedback signal for exciting said first inductor means, said feedback signal adjusting the intensity of said current to make the amplitude of the output signal equal to the amplitude of the temperature signal.

8. A system in accordance with claim 7 wherein said temperature signal means comprises a cell adapted for immersion in said sample fluid and containing a reference fluid, means for inducing an alternating current in the reference fluid, and inductor means responsive to the magnetic field created by said current for developing said temperature signal.

9. A system as claimed in claim 7 wherein said current inducing means operates from a reference signal, said system further comprising means for comparing said reference signal with said feedback signal to obtain a ratio thereof.

10. A system in accordance with claim 9 for obtaining direct indications of the salinity of the fluid, together with means for combining said ratio signal with a signal representing the salinity of the reference fluid to obtain a product signal.

11. In a method for obtaining indications of the conductivity of a fluid, the steps of immersing in the fluid a first inductor for inducing an alternating current therein and a second inductor responsive to the magnetic field created by said current, generating a signal representative of the temperature of the fluid, comparing said temperature signal with an output signal developed by the second inductor in response to the current to produce a feedback signal, and applying said feedback signal to the first inductor to adjust the intensity of said current to make the amplitude of said output signal approximately equal to the amplitude of said temperature signal.

12. In a method for obtaining indications of the salinity of a sample fluid, the steps of: inducing an alternating current in the sample fluid; immersing in the sample fluid a first inductor responsive to the magnetic field created by said current and a cell containing a second inductor immersed in a reference fluid; inducing an alternating current in said reference fluid; comparing the signals developed across the first and second inductors in response to the respective currents to produce a feedback signal, and utilizing said feedback signal for controlling the intensity of one of said currents to make the amplitudes of the output signals equal.

13. A method as set forth in claim 12 wherein said current induced in the reference fluid is generated by a reference signal, and comprising the further step of comparing said feedback and reference signals to obtain a ratio thereof.

References Cited

UNITED STATES PATENTS

| Re. 24,420 | 1/1958 | Fielden | 324—30 X |
| 2,542,057 | 2/1951 | Relis | 324—30 |
| 2,795,759 | 6/1957 | Rezek | 324—29 |
| 3,015,061 | 12/1961 | Boeke | 324—30 |
| 3,131,346 | 4/1964 | Parke | 324—30 |
| 3,151,293 | 9/1964 | Blake et al. | 324—30 |

RUDOLPH V. ROLINEC, *Primary Examiner.*

C. ROBERTS, *Assistant Examiner.*